US012481240B2

(12) United States Patent
Gokavarapu et al.

(10) Patent No.: US 12,481,240 B2
(45) Date of Patent: Nov. 25, 2025

(54) DETERMINING WHETHER TONER USED TO PRINT IMAGE IS AUTHORIZED

(71) Applicant: Hewlett-Packard Development Company, L.P., Spring, TX (US)

(72) Inventors: Veera Venkata Paparao Gokavarapu, Bangalore (IN); Steven Holland, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/693,653

(22) PCT Filed: Mar. 9, 2022

(86) PCT No.: PCT/US2022/019444
§ 371 (c)(1),
(2) Date: Mar. 20, 2024

(87) PCT Pub. No.: WO2023/048764
PCT Pub. Date: Mar. 30, 2023

(65) Prior Publication Data

US 2024/0393724 A1 Nov. 28, 2024

(30) Foreign Application Priority Data

Sep. 21, 2021 (IN) ............................. 202141042721

(51) Int. Cl.
*G03G 15/00* (2006.01)

(52) U.S. Cl.
CPC ................................ *G03G 15/5062* (2013.01)

(58) Field of Classification Search
CPC ........... G03G 15/5041; G03G 15/5058; G03G 15/5062; G03G 2215/00029–00067
See application file for complete search history.

(56) References Cited

U.S. PATENT DOCUMENTS 10,274,883 B1 4/2019 Kuo et al.
2006/0092210 A1* 5/2006 Maniam ............... G07D 7/1205 347/19

(Continued)

FOREIGN PATENT DOCUMENTS

JP 2011-048297 A 3/2011
JP 2021-113931 A 8/2021

OTHER PUBLICATIONS

Machine Translation of JP 2011-048297. Mar. 10, 2011. (Year: 2011).*

*Primary Examiner* — Carla J Therrien
(74) *Attorney, Agent, or Firm* — Brooks, Cameron & Huebsch, PLLC

(57) ABSTRACT

An image printed using toner is optically scanned. Whether the toner is authorized is determined by one or multiple of the following. A toner scatter pattern can be identified within the scanned image and whether the identified toner scatter pattern conforms to expected toner scatter patterns associated with authorized toner can be determined. A color within the scanned image can be identified and whether the identified color conforms to an expected corresponding color associated with the authorized toner can be determined. An image artifact within the scanned image associated with failure of a cartridge in which the toner is installed can be identified and whether the image artifact conforms to expected image artifacts associated with failure of an authorized cartridge in which the authorized toner is installed can be determined.

14 Claims, 8 Drawing Sheets

(56) References Cited

U.S. PATENT DOCUMENTS

| | | | | |
|---|---|---|---|---|
| 2009/0016749 | A1* | 1/2009 | Mashiba | G03G 15/0131 399/407 |
| 2009/0274342 | A1 | 11/2009 | Wu et al. | |
| 2010/0008693 | A1* | 1/2010 | Hayashi | G03G 15/0855 399/262 |
| 2010/0165370 | A1 | 7/2010 | Keithley et al. | |
| 2012/0251141 | A1 | 10/2012 | Henderson et al. | |
| 2019/0265611 | A1 | 8/2019 | Stafford et al. | |

* cited by examiner

DETERMINING WHETHER TONER USED TO PRINT IMAGE IS AUTHORIZED

BACKGROUND

Printing devices can use a variety of different technologies to form images on media such as paper. Such technologies include dry electrophotography (EP) and liquid EP (LEP) technologies, which may be considered as different types of laser and light-emitting diode (LED) printing technologies. Such printing technologies specifically deposit print material referred to as toner to form images on media. Toner is a powder mixture that can include granulated plastic, as well as other materials such as carbon power, iron oxide, polypropylene, fumed silica, and/or other materials.

DETAILED DESCRIPTION

Figure 1:
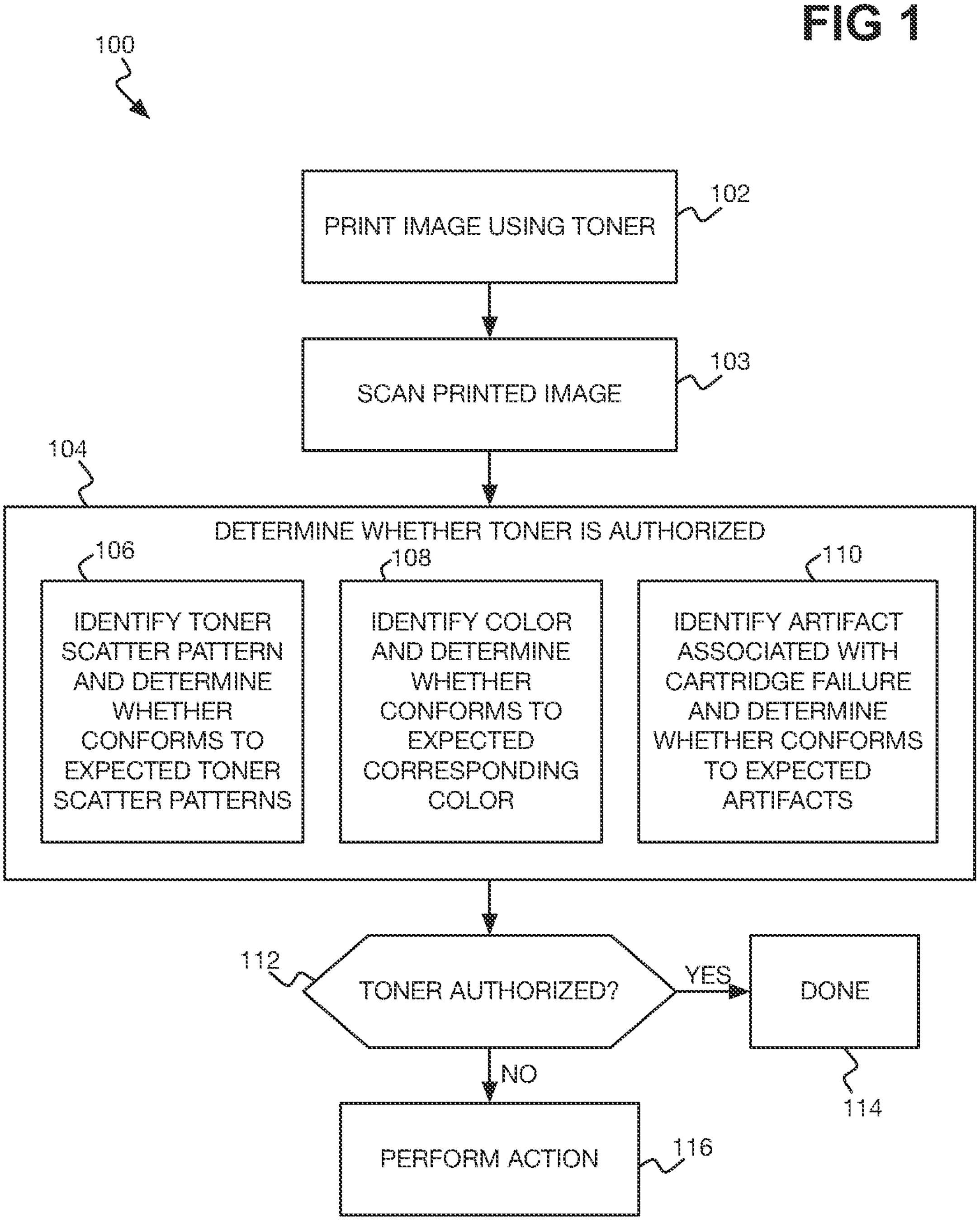
FIG. 1 is a flowchart of an example method to determine whether the toner that can be used to print images on media is authorized.

As noted in the background, some types of printing devices deposit toner to form images on media. Such a printing device can include a cartridge of toner that the device uses for printing. As the printing device prints print jobs, toner is consumed from the cartridge. When the cartridge is empty or is running low on toner, the cartridge may be replaced with a replacement cartridge that has a fresh (e.g., full) supply of toner.

A toner cartridge is one type of printing device consumable item assembly. A toner cartridge may include, besides a supply of toner, other components that the printing device uses for printing. Examples of such components can include a developer roller and/or other components. These components may remain in good working condition even when the supply of toner becomes depleted.

Therefore, some types of printing devices use consumable item assemblies that include just supplies of print material like toner. For example, a laser-printing device may use a toner reload kit that includes just a supply of toner and not a developer roller and/or other components that still have useful life even when the toner supply is depleted. The developer roller and other components may be part of other end user-replaceable consumable item assemblies within the printing device, or may not be meant to replaced by end users. Printing device consumable item assemblies that include just supplies of print material like toner can be manufactured and sold at lower cost than assemblies that also include other components like developer rollers.

Unlike a toner cartridge that has to remain installed within a printing device for the device to print using toner from the cartridge, a toner reload kit may be temporarily connected to a printing device to refill the device with toner, and can then be disconnected from the printing device. The printing device thereafter prints using the toner reloaded from the toner reload kit. The toner reload kit therefore does not have to remain connected to the printing device for the device to print using toner reloaded into the device from the kit.

To ensure that printing devices print with the best image and print quality possible, manufacturers advise users that they should use authorized consumable item assemblies including authorized print material like toner within the devices. An authorized consumable item assembly can be one that is manufactured by or for the manufacturer of a printing device and acquired from a trusted party. A user purchasing such a consumable item assembly can therefore be certain that usage of the item within his or her printing device will result in the best performance possible, and will not damage the device.

A consumable item assembly that is manufactured by or for the manufacturer is an authentic consumable item assembly. Acquisition of the assembly from a trusted party ensures that the item has not been impermissibly modified or reused, such as by being refilled with unauthorized toner, by an unauthorized party. That is, an otherwise authentic consumable item assembly that is impermissibly refilled with unauthorized toner can result in degraded image and print quality, and potentially damage the printing device, when reused in this manner. Acquisition from a trusted party further ensures that a counterfeit consumable item assembly will not be passed off as authentic.

To guard against unauthorized consumable item assemblies from being unknowingly used in printing devices, authentic consumable item assemblies may include authentication devices or other security features of varying sophistication by which the devices can verify that the items are indeed authentic. In certain cases, a printing device may prevent an assembly that fails authentication from being used, for instance, to prevent possible damage to the device, or for other reasons. In certain other cases, instead of preventing use of the consumables, the printing device may change operating parameters to a different mode to reduce the likelihood of device damage.

Such authentication devices can be in the form of security-hardened authentication integrated circuits (ICs) that contain information which can be authenticated by the printing devices, potentially in communication with a computing device operated by the manufacturer. Other authentication devices can be in the form of security tags, such as holograms, quality response (QR) codes, radio frequency identifier (RFID) and near-field communication (NFC) tags, and so on, including on the assemblies themselves. In this case, a printing device may verify that the consumable item assembly is authentic by reading, scanning, or communicating with the security tag.

Inclusion of an authentication device within a printing device consumable item assembly that a printing device itself has to verify as authentic can raise manufacturing costs in two ways, however. First, the printing device itself has to have the appropriate hardware in order to communicate with, read, or scan the authentication device of an assembly inserted into the device. The inclusion of this hardware within a printing device can raise the manufacturing costs of the printing device. Second, the manufacturing costs of the consumable item assembly itself may increase to accommodate the inclusion of the authentication device within the item, particularly in the case of a security-hardened IC. Manufacturers may be particularly sensitive to increased manufacturing costs for consumable item assemblies.

Techniques described herein ameliorate these issues by determining whether the toner itself is authorized, in some cases regardless of whether the toner is included within a toner cartridge that also includes other components or is included within a toner reload kit that just includes toner. Toner-based authorization determination can occur at lower cost than authentication techniques that rely on authentication devices as described above. This is because such authentication devices do not have to be included within the consumable item assemblies and printing devices do not have to include components to communicate with and verify the authentication devices. Moreover, toner-based authorization can successfully detect when an otherwise authorized printing device consumable item assembly has nevertheless been refilled with unauthorized toner.

FIG. 1 shows an example method 100 for determining whether the toner used by a printing device to print images on media like paper is authorized. The method 100 may be performed by the printing device itself, or may be performed by a host device, like a computer or other computing device, to which the printing device is communicatively connected and that may provide the images that the printing device is to print on media. The method 100 may instead by performed by a cloud computing device, such as a cloud server, to which the printing device is communicatively connected over a network like the Internet for management and other purposes in conjunction with cloud services provided by or on behalf of the manufacturer of the printing device. The method 100 may be implemented as program code stored on a non-transitory computer-readable data storage medium and executed by a processor, such as that of a printing device, a host device, or a cloud computing device.

The method 100 can include printing an image using toner (102). A host device may transmit the image to the printing device and cause the printing device to print the image. The printing device may instead read the image from a removable storage device connected to the printing device. The printing device prints the image in that print hardware of the device forms an image in toner on a photoconductive surface, and then may transfer the toner to and fuse the toner on a print medium.

The printing device may instead have the image prestored, such as in the case in which the image is a calibration image used to calibrate the printing device. For example, the printing device may be a color printing device having different colors of toner corresponding to the colors of the color space of the printing device, such as cyan, magenta, yellow, and black. The calibration image may be used by the printing device to calibrate the colors printed by the device for accuracy. The calibration image may not actually be printed on a print medium. For example, the calibration image may be formed in toner on a photoconductive surface but the toner may not be subsequently transferred to and fused on a print medium.

The method 100 can include scanning the printed image (103). In one implementation, in the case in which a communicatively connected host or cloud computing device performs the method 100, the scan hardware that scans the printed image may be separate from the printing device including the print hardware that printed the image. A user may therefore remove the print medium on which the image was printed from the printing device and place the medium on a scanning device also communicatively connected to the host or cloud computing device for scanning.

In another implementation, the printing device may include scan hardware that scans the printed image as printed on the print medium or as printed on the photoconductive surface. The scan hardware may be inline with the print hardware of the printing device along a print path, in which case an image is printed on a print medium by the print hardware and then the print medium is advanced to the scan hardware for scanning the printed image. The scan hardware may instead be able to scan the image as printed on the photoconductive surface, before or regardless of whether the toner is transferred to a print medium.

The method 100 includes determining whether the toner is authorized based on the scanned image that has been printed using toner (104). Authorized toner includes toner that is manufactured by or for the manufacturer of the printing device. The actual composition of the toner may be a trade secret known just to the manufacturer and not to unauthorized parties that may manufacture or sell unauthorized toner. The authorized toner may be manufactured using manufacturing techniques that are not available to unauthorized parties. The authorized toner may satisfy specifications and manufacturing tolerances that unauthorized toner does not.

Therefore, the authorized toner has characteristics that unauthorized toner does not, and the method 100 determines whether the toner is authorized by identifying such characteristics from the scanned image that has been printed using toner. Specifically, one or multiple of three different ways may be used to determine whether the toner is authorized. First, the method 100 may identify a toner scatter pattern within the scanned image and determine whether the identified toner scatter pattern conforms to expected toner scatter patterns associated with authorized toner (106). This technique is described later in the detailed description in relation to FIGS. 2 and 3.

Second, the method 100 may identify a color within the scanned image and determine whether the identified color conforms to an expected corresponding color associated with the authorized toner (108). This technique is described later in the detailed description in relation to FIG. 4. The first and second techniques can be employed regardless of whether the printing device uses toner from a toner cartridge that includes other components that the device uses for printing, or whether the printing device uses toner transferred to the printing device from a temporarily connected toner refill kit that includes just toner.

The third technique, by comparison, pertains just to the case in which the toner is installed within a toner cartridge including other components that are used by the printing device for printing. Specifically, the method 100 may identify an image artifact associated with failure of the cartridge in which the toner is installed and determine whether the image artifact conforms to expected image artifacts associated with failure of an authorized cartridge in which authorized toner is installed (110). This technique is described later in the detailed description in relation to FIGS. 5A, 5B, 5C, and 6.

The method 100 may determine whether toner is authorized using one or multiple of these techniques, as noted. If more than one technique is used, the toner may be considered authorized so long as every technique successfully authenticates the toner as authorized, or so long as any technique successfully authenticates the toner as authorized.

In another implementation, if more than one technique is used, then the toner may be considered authorized so long as more than a threshold number (e.g., a majority) of the techniques successfully authenticate the toner as authorized.

If the toner used to print the image that was scanned is determined as being authorized (112), then the method 100 is finished (114). Otherwise, in response to determining that the toner is not authorized (112), the method 100 includes performing an action associated with the toner (116). For example, the action may be prohibiting further printing by the printing device in which the toner is installed. The user may have to replace the currently installed toner cartridge with a cartridge including authorized toner, for instance.

In the case in which a toner refill kit is used, the action may be permitting printing by the printing device for a number of pages corresponding to the internal toner capacity of the device, to utilize the remaining unauthorized toner. If unauthorized toner is subsequently still detected-corresponding to the printing device being again refilled with unauthorized toner-further printing may then be prohibited. A user may be given a warning that unauthorized toner has been detected and notified that the printing device will not be able to be used for printing if again refilled with unauthorized toner.

Other actions that can be performed include changing the parameters governing how the printing device prints to a lesser quality print mode or to a mode that will protect the printing device from possible damage due to the usage of unauthorized toner. For instance, printing may occur more slowly, or without specific picture quality enhancements. A cloud service to which the printing device is communicatively connected may be notified that unauthorized toner usage has been detected. In the case in which the printing device performs the method 100, a communicatively connected host device may additionally or instead be notified of such unauthorized toner usage.

Figure 2:
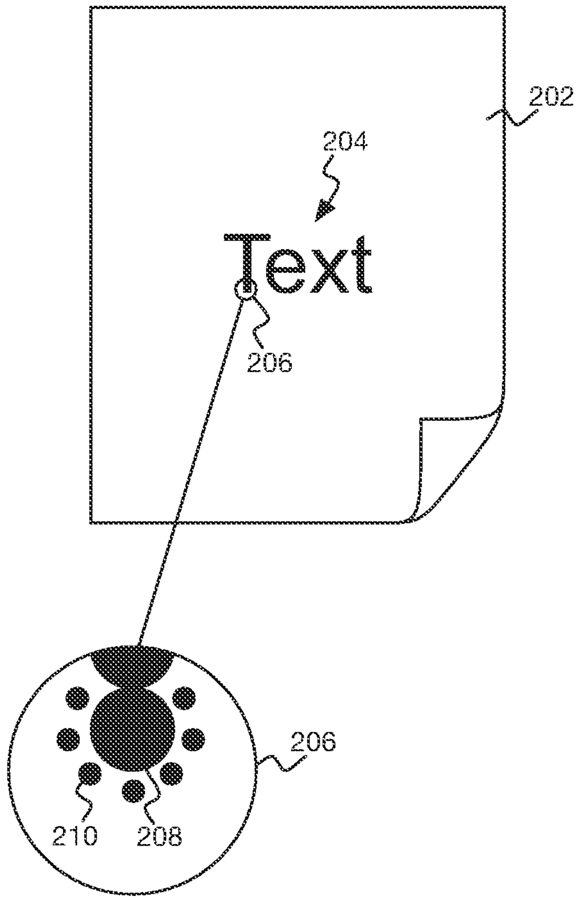
FIG. 2 is a diagram of an example toner scatter pattern.

The usage of a toner scatter pattern to determine whether toner is authorized is now described. FIG. 2 shows an example image 204, made up of the word "Text," as printed on a print medium 202 using toner. As identified by the zoomed-in area 206, the image 204 is formed as a collection of pixels, or dots, 208. A printing device may print with a specified resolution, such as 300 or 600 dots-per-inch (dpi). Therefore, the dots 208 are printed in correspondence with the image 204 being printed. The naked eye may be unable to discern individual such dots 208, and/or the dots 208 may overlap one another such that they are not individually discernable.

When an individual toner dot 208 is printed, there can be unintended toner scatter 210, which may also be referred to as toner spray. Such toner scatter 210 can be in the form of smaller dots surrounding the intended, larger dot 208 forming the image 204. While printing devices have improved to minimize such toner scatter 210, such toner scatter 210 may nevertheless still occur, even if undetectable to the naked eye. However, scanning of the image 204 may occur at equal or higher resolution, such as 600, 1,200, 2,400 dpi, or more, and therefore the toner scatter 210 is able to be detected within the image 204 as scanned.

Moreover, authorized toner may have a different pattern of toner scatter 210 than unauthorized toner, due to its being different in formulation or composition. The pattern of toner scatter 210 may differ in terms of the number of smaller dots typically occurring in such scatter 210, the distance from the intended dot 208, whether the scatter 210 is symmetrical or asymmetrical in pattern about the dot 208, and so on. Therefore, the pattern of toner scatter 210 of the image 204 as printed can be used to determine whether the toner by which the image 204 was printed is authorized.

Figure 3:
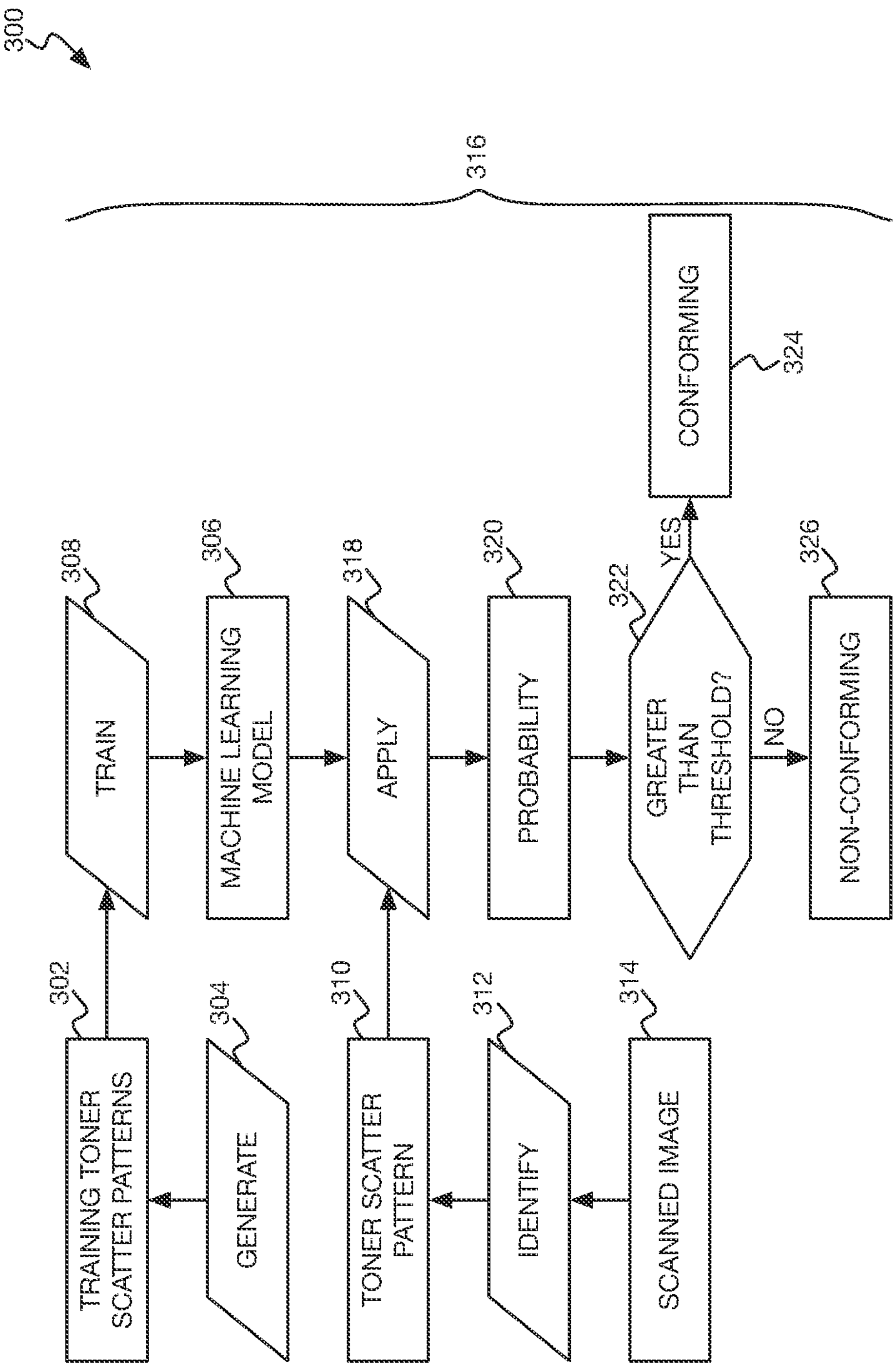
FIG. 3 is a diagram of an example process for determining whether toner is authorized based on toner scatter patterns.

FIG. 3 show an example process 300 for using toner scatter pattern to determine whether the toner used to print an image was authorized. The process 300 can be implemented as program code stored on a non-transitory computer-readable data storage medium and executed by processors of one or multiple devices. For example, the process 300 may be completely performed at a cloud computing device such as a cloud server to which the printing device or a host device is communicatively connected. As another example, the first part of the process 300 may be performed by such a cloud server or other computing device operated by or for a manufacturer of the printing device, and the second part may be performed by a printing device or a host device communicatively connected to the printing device.

In the first part of the process 300, training toner scatter patterns 302 are generated (304), and then a machine learning model 306 is trained (308) using the training toner scatter patterns 302. The training toner scatter patterns 302 are toner scatter patterns within scanned images printed using authorized toner. The training scatter patterns 302 can include just portions of scanned images including toner scatter (e.g., just the area 206 of the image 204). The toner scatter patterns 302 within the scanned images may be manually identified, or may be automatically identified.

For example, areas of images that include individually discontiguous isolated dots may be automatically identified and assumed to include toner scatter, as the toner scatter patterns 302. An isolated dot is a dot that does not have any contiguously adjacent dots. As another example, areas of images that include edge dots may be automatically identified and likewise assumed to include toner scatter, as the toner scatter patterns 302. An edge dot is a dot that may have contiguously adjacent dots, but not at all sides, such that toner scatter is detectable on those sides of the edge dot at which there are not contiguously adjacent dots.

The machine learning model 306 may be a deep learning model such as an image-classifying deep neural network. When applied to an input toner scatter pattern, such a machine learning model 306, after having been trained on the training toner scatter patterns 302, outputs a probability as to the likelihood that the input toner scatter pattern was printed with authorized toner. That is, the trained machine learning model 306 outputs a probability as to whether the input toner scatter pattern conforms to expected toner scatter patterns (e.g., the training toner scatter patterns 302) associated with authorized toner.

The machine learning model 306 may generate feature vectors to calculate the probability that the input toner scatter patterns 302 was printed with authorized toner. Such feature vectors may represent properties of input toner scatter patterns 302, including reduced-dimensionality versions of the patterns 302. The feature vectors may be generated using an autoencoding model, where an encoder is used to encode feature vectors from the input toner scatter patterns 302, and a decoder is used to regenerate the input toner scatter patterns 302 from the feature vectors. An image-classifying head model can then be employed to predict the likelihood that a given input toner scatter pattern 302 corresponds to authorized toner usage, based on the decoded patterns 302 and/or the encoded feature vectors.

The feature vectors may be representable in a multimodal space. A multimodal space may include k-dimensional coordinate system. When the image feature vectors are populated in the multimodal space, similar image features may be identified by comparing the distances of the feature vectors in the multimodal space to identify a matching image. One example of a distance comparison may include a cosine proximity, where the cosine angles between feature vectors in the multimodal space are compared to determine closest feature vectors. Cosine similar features may be proximate in the multimodal space, and dissimilar feature vectors may be distal. Feature vectors may have k-dimensions, or coordinates in a multimodal space. Feature vectors with similar features are embedded close to each other in the multimodal space in vector models.

Feature-based vector representation may use various models, to represent images in a continuous vector space. Different techniques may be applied to represent different features in the vector space, and different levels of features may be stored. Predictive methods directly perform prediction based on neighbors in terms of learned small, dense embedding vectors (considered parameters of the model). Other layers may capture other features within the image as well.

In the second part of the process 300, therefore, a toner scatter pattern 310 is identified (312) from a scanned image 314 that was printed using toner. As with the training toner scatter patterns 302, the toner scatter pattern 310 may be automatically identified by identifying areas of the scanned image 314 including isolated and edge dots. There may be more than one toner scatter pattern 310 identified within a given scanned image 314 in some cases, particularly depending on the number of isolated and edge dots that have been printed.

Whether the identified toner scatter pattern conforms to expected toner scatter patterns associated with authorized toner is then determined (316). Specifically, the trained machine learning model 306 is applied (318) to the toner scatter pattern 310 to generate a probability 320 as to whether the toner used to print the image 314 is authorized. In the case in which more than one toner scatter pattern 310 has been identified within the scanned image 314, then the machine learning model 306 is applied to each pattern 310 to generate a probability 320 for each pattern 310. The probabilities 320 for the toner scatter patterns 310 may then be averaged or otherwise statistically combined to generate an overall, single probability 320.

If the probability 320 (such as the overall probability 320 in the case in which multiple toner scatter patterns 310 were identified) is greater than a threshold (322), then the process 300 concludes the that the identified toner scatter pattern 310 conforms to the expected toner scatter patterns associated with authorized toner (324). That is, on the basis of the toner scatter pattern 310, the toner used to print the image 314 that was then scanned is deemed as authorized. If the probability 320 is less than the threshold (322), however, then the process 300 concludes that the toner scatter pattern 310 does not conform to the expected toner scatter patterns associated with authorized toner (326). The toner used to print the image 314 is thus deemed as unauthorized.

The usage of toner color to determine whether toner is authorized is described next. Toner color can be used in the case of a color printing device, which prints full color images by suitably overlaying dots of the primary colors of the printing device, such as cyan, magenta, yellow, and black. Such a printing device prints using cyan toner, magenta toner, yellow toner, and black toner. Authorized such cyan, magenta, and yellow toner in particular may be manufactured within a certain accuracy tolerance range, in that the printed color of authorized toner is accurate to its specified corresponding color by more than a threshold. By comparison, unauthorized toner of a corresponding color may not be manufactured with as much accuracy. Therefore, if an identified color within a printed image that has been scanned does not match an expected corresponding color by more than a threshold, the image may have been printed with unauthorized toner.

Figure 4:
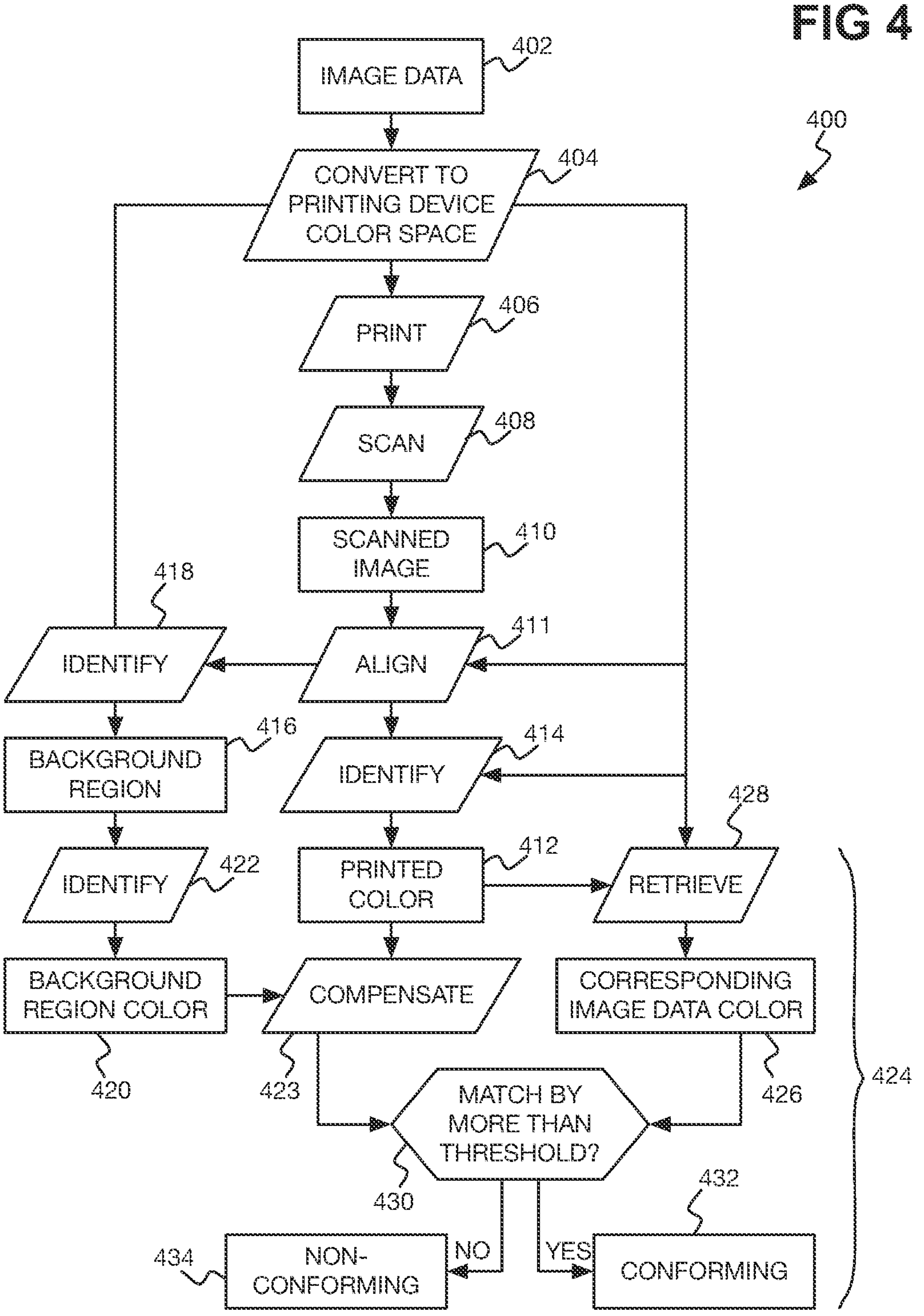
FIG. 4 is a diagram of an example process for determining whether toner is authorized based on toner color.

FIG. 4 shows an example process 400 for using toner color to determine whether the toner used to print an image was authorized. The process 400 can be implemented as program code stored on a non-transitory computer-readable data storage medium and executed by a processor of a device. This device may be a printing device, a host device communicatively connected to the printing device, or a cloud device to which the printing device is communicatively connected, for instance.

Image data 402 of the image to be printed may be converted to the color space of the printing device (404), such as the cyan-magenta-yellow-black (CMYK) color space. The image data 402 includes color values for each of a number of pixels of the image, in an image color space. For example, if the image data 402 is in the red-green-blue (RGB) color space, then the image data 402 includes red, green, and blue values for each pixel of the image. These red, green, and blue values image are converted to cyan, magenta, yellow, and black values for the same color. The conversion may occur in the printing device itself or at the host computing device to which the computing device is communicatively connected. However, if the image data 402 is for a calibration image used to color calibrate the printing device, then the image data 402 may already be in the CMYK color space, such that conversion is not performed.

The printing device then prints the image (406). The image may be printed on a print medium (i.e., printed in toner on a photoconductive surface and the toner then transferred from this surface to the print medium and fused on the medium), or may be printed on a photoconductive surface (i.e., printed in toner on a photoconductive surface without subsequent toner transfer to a print medium). The printed image is scanned (408) to generate a scanned image 410. The image may be scanned by scan hardware of the printing device, or by a scanning device separate from the printing device.

The scanned image 410 is aligned (411) with the image data 402 as may have been converted to the printing device color space. That is, the scanned image 410 is registered with the image data 402, so that corresponding pixels of the scanned image 410 and the image data 402 have the same x, y coordinates in the case in which a Cartesian coordinate system is specifically used. As part of such alignment or registration, the scanned image 410 may be deskewed. For instance, if the scan hardware of a printing device is not completely perpendicular to the print path along which a print medium is advanced after having been printed on, then the left edge of the image 410 will increase or decrease in the x coordinate with an increase in the y coordinate from top to bottom, as will the right edge. Once the scanned image 410 has been deskewed, the image 410 can then be shifted left or right and/or up and down to register or align the image 410 with the image data 402.

After alignment of the scanned image 410, a printed color 412 can be identified (414) within the scanned image 410. More than one printed color 412 may be identified as well. A printed color 412 may be randomly selected as any color printed using toner by the printing device (i.e., as opposed to a blank region that has not been printed using toner). To identify a pixel of the scanned image 410 corresponding to a printed color 412, the converted image data 402 can be inspected to identify the x, y coordinates of any pixel having non-zero color values, which means that toner was printed for such a pixel. The color values of the pixel within the scanned image 410 constitute the printed color 412. In the case in which the scanned image 410 is not in the printing device color space (e.g., in the case in which the scanned image 410 is in the RGB color space), these color values are converted to the printing device color space.

To particularly identify which color of toner may be authorized or unauthorized, a printed color 412 can be a primary color, such as cyan, magenta, or yellow, as opposed to any random color that has been printed. The image data 402 can be inspected to identify the x, y coordinates of such a pixel, with the color values of the pixel within the scanned image 410 again constituting the printed color 412. While user-provided images may or may not have pixels of cyan, magenta, or yellow, calibration images used to color calibrate the printing device will have individual cyan, magenta, and yellow regions. Moreover, while user-provided images may be converted to the printing device color space in such a way that compensates for toner color inaccuracy (i.e., after color calibration of the printing device), calibration images are not and therefore reflect the actual color of the toner used for printing.

Particularly in the case in which the scanned image 410 is of the image data 402 as has been printed on a print medium, the color of the print medium can affect the printed color 412 that was identified. For example, while the print medium may be white in the case of office paper, it may not be perfectly white, such that its color affects the printed color 412. Even in the case in which the image data 402 is printed on a photoconductive surface and not subsequently transferred to a print medium, the color of the photoconductive surface can affect the printed color 412 that was identified within the scanned image 410.

Therefore, a background region 416 of the scanned image 410 is identified (418), based on the image data 402 as may have been converted to the printing device color space. The background region 416 is an area at which no toner was printed. The background region 416 can be identified by identifying a pixel of the scanned image 410 for which the corresponding pixel in the image data 402 has zero color values, denoting that no toner is printed for that pixel. The background region color 420 of the background region 416 is then identified (422). The color values of the pixel within the scanned image 410 (after alignment) constitute the background region color 420. In the case in which the scanned image 410 is not in the printing device color space (e.g., in the case in which the scanned image 410 is in the RGB color space), these color values are converted to the printing device color space.

The background region color 420 is then compensated (423) for within the printed color 412. That is, the background region color 420 is subtracted from the printed color 412. For example, the cyan, magenta, yellow, and black color values of the background region color 420 are subtracted from the cyan, magenta, yellow, and black color values of the printed color 412, respectively. The resulting color values constitute the background region color-compensated printed color 412.

Whether the printed color 412 conforms to the expected corresponding color associated with authorized toner is then determined (424). Specifically, the color 426 of the image data 402 (as may have been converted) corresponding to the printed color 412 may be retrieved (428). The corresponding image data color 426 includes the color values of the pixel within the image data 402 having the same x, y coordinates as the pixel of the scanned image 410 having the printed color 412.

The printed color 412 should match the corresponding image data color 426. Ideally, for instance, the color values of the printed color 412 should be identical to the color values of the corresponding image data color 426. For authorized toner, the printed color 412 will match the corresponding image data color 426 by more than a matching threshold corresponding to the expected color accuracy tolerances of authorized toner. The Euclidean distance or other measure of distance between the printed color 412 and the corresponding image data color 426 within the printing device color space may be determined, for instance. If the distance is less than a distance threshold, then it is deemed that the printed color 412 matches the corresponding image data color 426 by more than the matching threshold corresponding to the expected color accuracy tolerances of authorized toner.

If the printed color 412 matches the corresponding image data color 426 by more than the matching threshold (430), then the process 400 concludes that the printed color 412 conforms to the expected color associated with authorized toner (432). That is, on the basis of the printed color 412, the toner used to print the image 410 that was scanned is deemed as authorized. If the printed color 412 does not match the corresponding image data color 426 by more than the matching threshold (430), then the process 400 concludes that the printed color 412 does not conform to the expected color associated with authorized toner (434). The toner used for printing is thus deemed as unauthorized. In one implementation, several instances of the same or different printed color 412 are examined before concluding that the toner used for printing is authorized, to compensate for imperfections in the print medium, variations in printing, and so on. That is, a threshold percentage or number of instances of printed color 412 may have to each not conform to its corresponding expected color before the toner used for printing is deemed as unauthorized.

Since multiple colors of toner are used in a color printing device, not all toner may be unauthorized. If the printed color 412 that is identified corresponds to a primary color of the printing device color space, then the authorization determination is made as to that primary color of toner. More than one printed color 412 may therefore be determined, one for each primary color. In this way, the individual colors of toner can each be determined as to whether they are authorized or not. Multiple printed colors 412 for each primary color may also be determined, with their distances to the primary color in question averaged in order to determine whether the printed colors 412 match the primary color by more than the matching threshold.

If the printed color 412 that is identified does not correspond to a primary color of the printing device color space, however, then the authorization determination may be made for all colors of toner. That is, if the printed color 412 does not match the expected color associated with authorized toner by more than the matching threshold, then in one implementation it is concluded that toner of every color is not authorized. In another implementation, though, how the printed color 412 differs the corresponding image data color 426 within the printing device color space can be analyzed to determine which color or colors of toner are not authorized.

For example, just some of the cyan, magenta, yellow, and black values of the printed color 412 may not match the cyan, magenta, yellow, and black values of the corresponding image data color 426 by more than the matching threshold. The toner of each color for which the values do not match by more than the matching threshold is deemed as unauthorized. By comparison, the toner of each color for which the values do match by more than the matching threshold is deemed as authorized.

The usage of image artifacts associated with toner cartridge failure to determine whether toner is authorized is now described. As toner cartridges near the end of their useful life, they may fail in such a way that printed images include image artifacts. The types of image artifacts, and the characteristics of the image artifacts of each type, can differ depending on the toner cartridge being used. This means that an authorized toner cartridge may result in image artifacts when it fails that differ from those associated with failure of an unauthorized toner cartridge. Therefore, such image artifacts if present can be used to determine whether toner is authorized, since an unauthorized cartridge will not be filled with authorized toner.

Figure 5A:
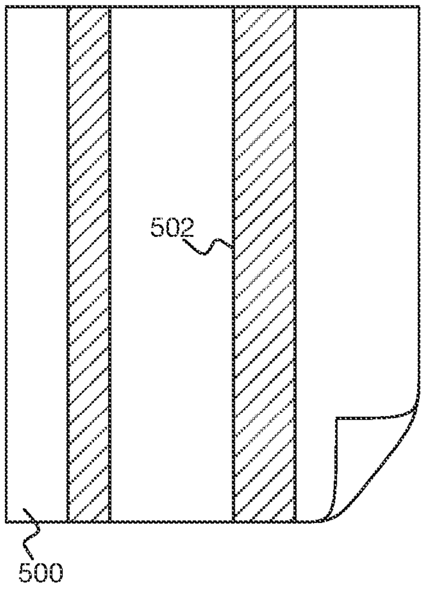
FIGS. 5A, 5B, and 5C are diagrams of example image artifacts associated with toner cartridge failure.
Figure 5B:
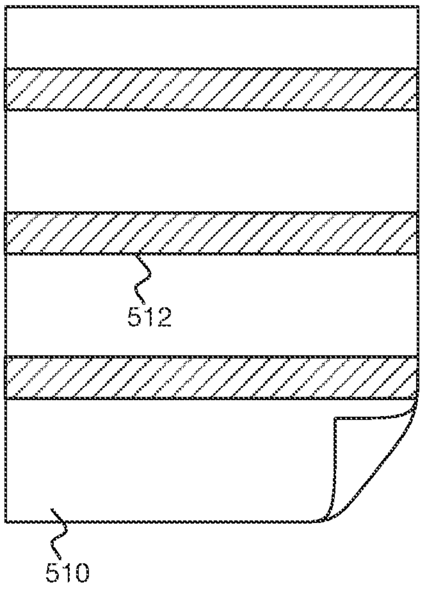
Figure 5C:
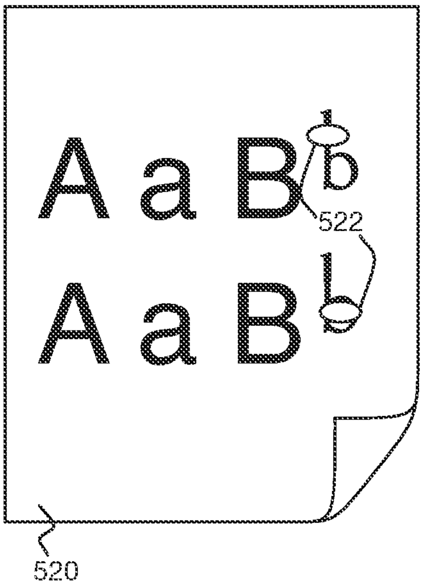

FIGS. 5A, 5B, and 5C show different examples of image artifacts associated with toner cartridge failure. In FIG. 5A, a printed image 500 includes vertical streaks 502, which are one type of image artifacts that can result when a toner cartridge begins to fail. The number, positions, and sizes of the streaks 502 may differ for an authorized toner cartridge as compared to an unauthorized toner cartridge.

In FIG. 5B, a printed image 510 includes horizontal bands 512, which are another type of image artifacts that can result when a toner cartridge begins to fail. The frequency, number, and sizes of the bands 512 may differ for an authorized toner cartridge as compared to an unauthorized toner cartridge.

In FIG. 5C, a printed image 520 includes areas 522 of toner dropout at which toner was not properly developed and thus was not printed. The frequency, number, and sizes of the toner dropout areas 522 may similarly differ for an authorized toner cartridge as compared to an unauthorized toner cartridge.

Figure 6:
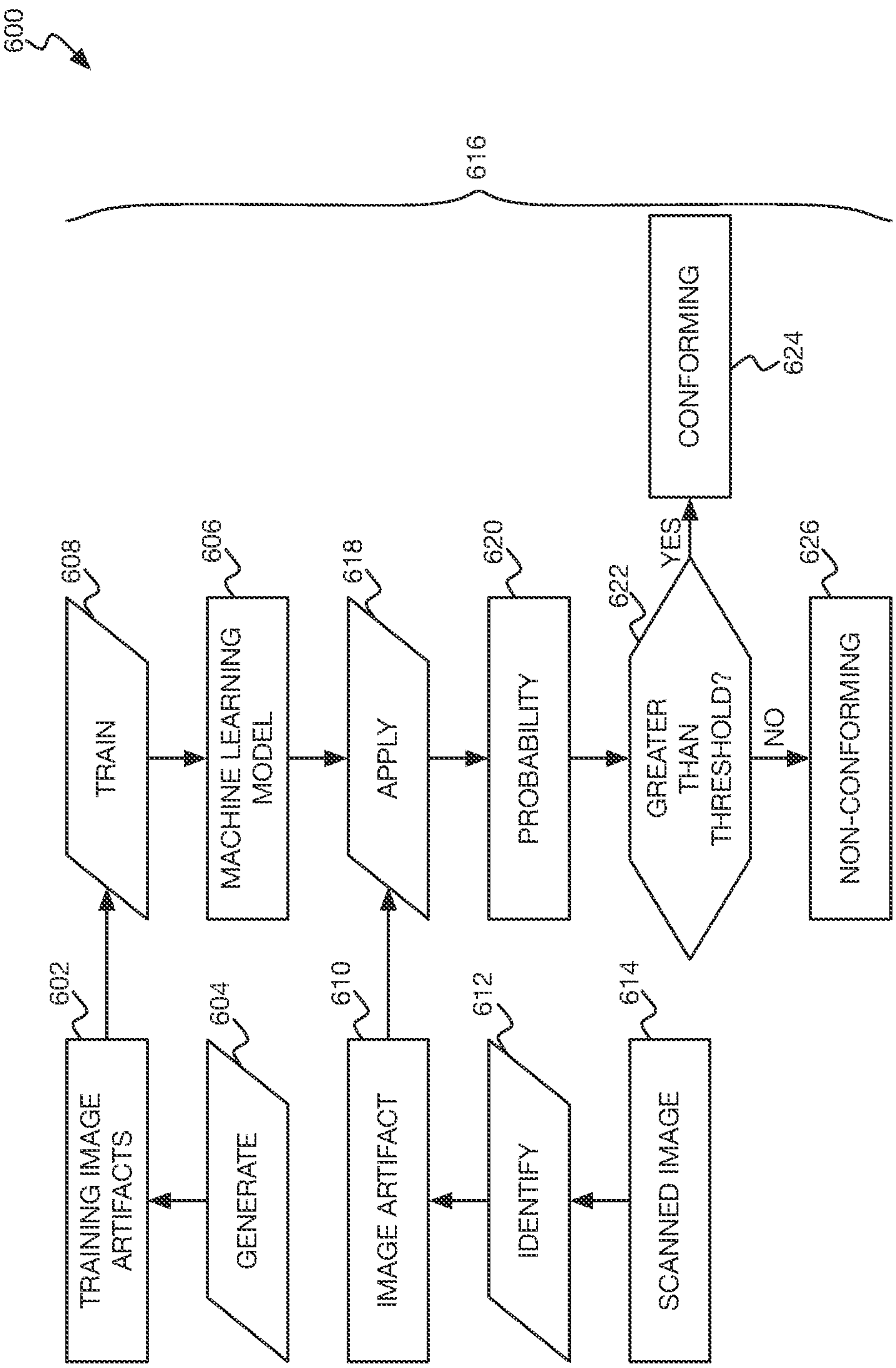
FIG. 6 is a diagram of an example process for determining whether toner is authorized based on image artifacts associated with toner cartridge failure.

FIG. 6 shows an example process 600 for using image artifacts associated with toner cartridge failure to determine whether the toner used to print an image was authorized. The process 600 can be implemented as program code stored on a non-transitory computer-readable data storage medium and executed by processors of one or multiple devices. For example, the process 600 may be completely performed at a cloud computing device such as a cloud server to which the printing device or a host device is communicatively connected. As another example, the first part of the process 600 may be performed by such a cloud server or other computing device operated by or for a manufacturer of the printing device, and the second part may be performed by a printing device or a host device communicatively connected to the printing device.

In the first part of the process 600, training image artifacts 602 are generated (604), and then a machine learning model 606 is trained (608) using the training image artifacts 602. In one implementation, the training image artifacts 602 are scanned images printed using authorized toner from authorized toner cartridges and that exhibit such image artifacts 602. That is, the image artifacts 602 are not separately identified within the scanned images, but constitute the images themselves. The images that are printed may be blank images, so that the scanned images include just the image artifacts that do not reflect the image data that was printed. In another case, the images may not be blank images. However, the image data that was printed may be removed from the scanned images so that just the image artifacts remain.

The machine learning model 606 may be a deep learning model such as an image-classifying deep neural network. When applied to an input image artifact, which may itself also be a scanned image in its entirety, such a machine learning model 606, after having been trained on the training image artifacts 602, outputs a probability as to the likelihood that the input image artifact was printed using an authorized toner cartridge and thus with authorized toner. That is, the trained machine learning model 606 outputs a probability as to whether the input image artifact conforms to expected image artifacts (e.g., the training image artifacts 602) associated with failure of authorized toner cartridges including authorized toner. The specifics of the machine learning model 606 can be similar to those of the machine learning model 306 that has been described above.

In the second part of the process 600, therefore, an image artifact 610 is identified (612) from a scanned image 614 that was printed using toner from a toner cartridge. In one implementation, the scanned image 614 may itself constitute the image artifact 610, particularly if the scanned image 614 corresponds to a blank image having been printed. In another implementation, the image data that was printed may be removed from the scanned image 614 to generate the image artifact 610.

Whether the identified image artifact 610 conforms to expected image artifacts associated with failure of authorized toner cartridges is then determined (616). Specifically, the trained machine learning model 606 is applied (618) to the image artifact 610 to generate a probability 620 as to whether the toner cartridge and thus the toner used to print the image 614 is authorized. If the probability 620 is greater than a threshold (622), then the process 600 concludes that the image artifact 610 conforms to the expected image artifacts associated with authorized toner cartridge failure (624), such that on the basis of the image artifact 610, the toner used to print the image 614 is deemed as authorized. If the probability 620 is less than the threshold (622), however, then the process 600 concludes that the image artifact 610 does not conform to the expected image artifacts in question (626), such that the toner is deemed as unauthorized.

Figure 7:
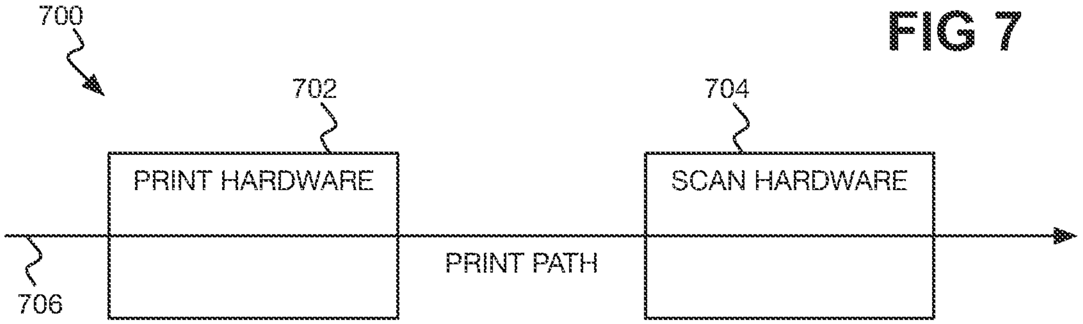
FIG. 7 is a block diagram of an example printing device in which scan hardware is inline with and subsequent to print hardware within a print path.
Figure 8:
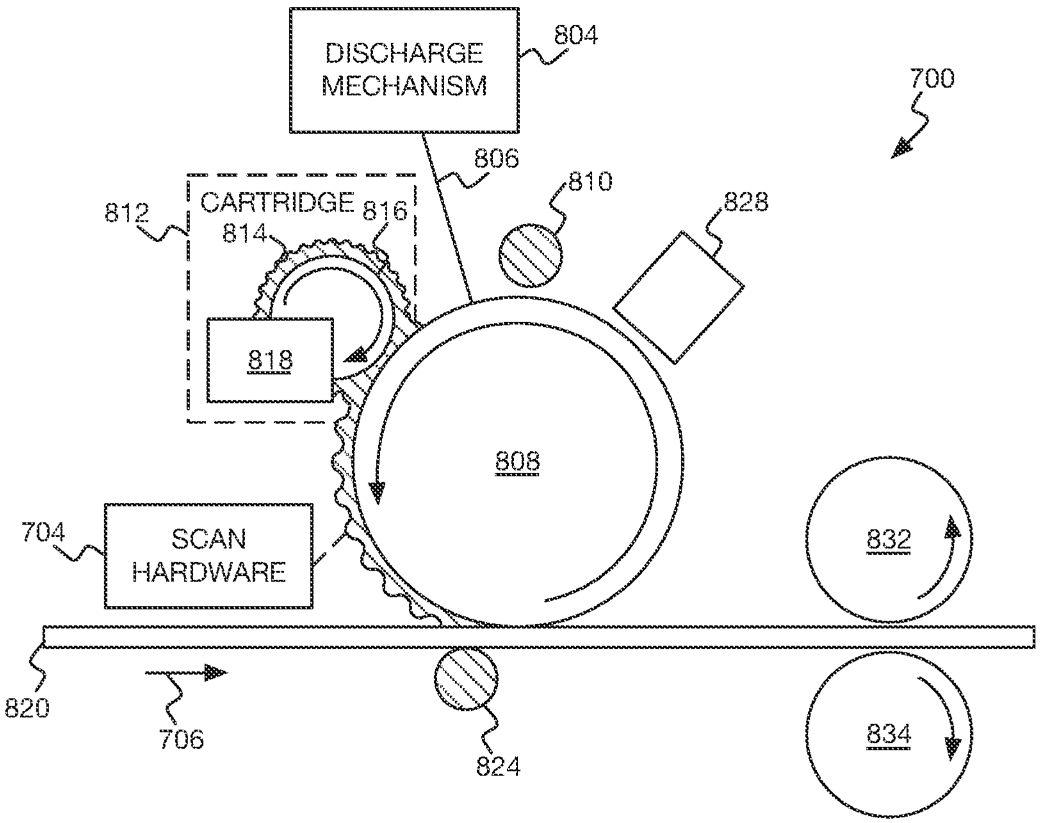
FIG. 8 is a diagram of an example printing device in which scan hardware scans an image formed on a photoconductive surface of print hardware.

As noted, the printing device that prints the image that is the scanned for determining whether the toner used to print the image is authorized can include both the print hardware that prints the image using toner and the scan hardware that scans the image as has been printed. FIGS. 7 and 8 show different examples of such a printing device 700 that includes print hardware 702 to print an image using toner and scan hardware 704 to scan the image as has been printed. The print hardware 702 is explicitly identified in FIG. 7, whereas the print hardware 702 in FIG. 8 includes components other than the scan hardware 704, the toner cartridge 812, and the print media sheet 820.

In FIG. 7, the scan hardware 704 is in line with but subsequent to the print hardware 702 along the print path 706 of print media through the printing device 700. Therefore, the print hardware 702 prints an image on a print medium, and then the print medium is advanced past through the scan hardware 704 that scans the printed image to generate a scanned image. In the example of FIG. 7, therefore, the scan hardware 704 cannot scan the image as printed in toner on a component of the print hardware 702, such as a photoconductive surface, prior to transfer of the toner to a print medium or in the case in which the toner is not transferred to the print medium.

In FIG. 8, the specific components of the print hardware 702 of the printing device 700 are depicted so as to show where the scan hardware 704 may be disposed in relation to these components. As previously noted, the print hardware 702 is not explicitly called out in FIG. 8 as such, however. It is further noted that the print hardware 702 in FIG. 7 may be implemented as shown in FIG. 8, in which case the scan hardware 704 is positioned to the right of the rollers 832 and 834.

The print hardware 702 includes an optical photoconductor (OPC) mechanism 808, which is more generally a photoconductive surface, and which may also be referred to and/or may include a photoreceptor drum, an image drum, a photoreceptor drum assembly, or a photoconductive belt. The OPC mechanism 808 can initially be given a total charge via a pre-charging mechanism 810 of the print hardware 702, such as a charge roller or a charged corona wire. In another implementation, the OPC mechanism 808 may instead be initially uncharged.

As the OPC mechanism 808 rotates, such as in the counterclockwise direction, a discharge mechanism 804 of the print hardware 702 emits light 806 onto the surface of the OPC mechanism 808 to selectively discharge the OPC mechanism 808 (or selectively charge the OPC mechanism 808 if initially uncharged) in accordance with an image to be printed. The discharge mechanism 804 thus draws the image as a pattern of electrical charges, which can be referred to as an electrostatic image. The discharge mechanism 804 may include a laser source in the case of a laser printing device, or a light-emitting diode (LED) array in the case of an LED printing device.

After the pattern has been set, the print hardware 702 coats the OPC mechanism 808 with charged toner 814. In monochrome printers, black toner is used; in color printers, three or more primary colors, as well as black, may be used. Because the toner 814 is charged, it clings to the discharged areas but not to the charged background of the OPC mechanism 808 (or vice-versa). A toner-application mechanism 816, like a developer roller, may dispense the toner 814 onto the OPC mechanism 808 in this manner, after first rotating through a toner hopper 818 to pick up the toner 814. The toner-application mechanism 816 and the toner hopper 818 may be part of a toner cartridge 812 also including the toner 814.

With the toner 814 printed on the OPC mechanism 808 in a loosely affixed manner, the scan hardware 704 may optically capture the printed image. The OPC mechanism 808 then rolls over a sheet 820 of print media, which may advance along the print path 706. Before the media sheet 820 rolls under the OPC mechanism 808, it can be given a charge by a toner-transfer mechanism 824 of the print hardware 702, such as a transfer charge roller or a transfer charge corona wire. The force upon the toner 814 resulting from this charge is stronger than the force holding the toner 814 to the OPC mechanism 808, so the media sheet 820 pulls the toner 814 away from the mechanism 808.

The media sheet 820 finally passes between fuser rollers 832 and 834, which rotate in opposite directions. As the media sheet 820 passes between the rollers 832 and 834, the loose toner 814 melts, flowing onto the surface of the sheet 820, and fusing the toner 814 to the media sheet 820. The OPC mechanism 808 finally passes a cleaning station 828, which preparedly cleans the surface of the OPC mechanism 808 before the process that has been described is repeated.

An image, such as a calibration image, may be printed on the OPC mechanism 808 and scanned by the scan hardware 704 without subsequent transfer to a sheet 820 of print media. In this case, after the image printed in toner 814 on the OPC mechanism 808, the toner 814 is removed from the surface of the OPC mechanism 808 by the cleaning station 828. The fuser rollers 832 and 834 and the toner-transfer mechanism 824 are not employed.

The scan hardware 704 may instead of being positioned to the left of the OPC mechanism 808 be positioned to the right of the OPC mechanism 808. In this implementation, the scan hardware 704 may be rotatable so that it can be directed leftwards towards the OPC mechanism 808 or downwards towards a sheet 820 of print media being advanced through the printing device 700. When directed leftwards towards the OPC mechanism 808, the scan hardware 704 can scan an image printed in toner 814 on the mechanism 808 so long as no print media sheet 820 is being advanced through the printing device 700. When directed downwards towards the media sheet 820, the scan hardware 704 can scan the image after the toner 814 has been transferred to the sheet 820.

Figure 9:
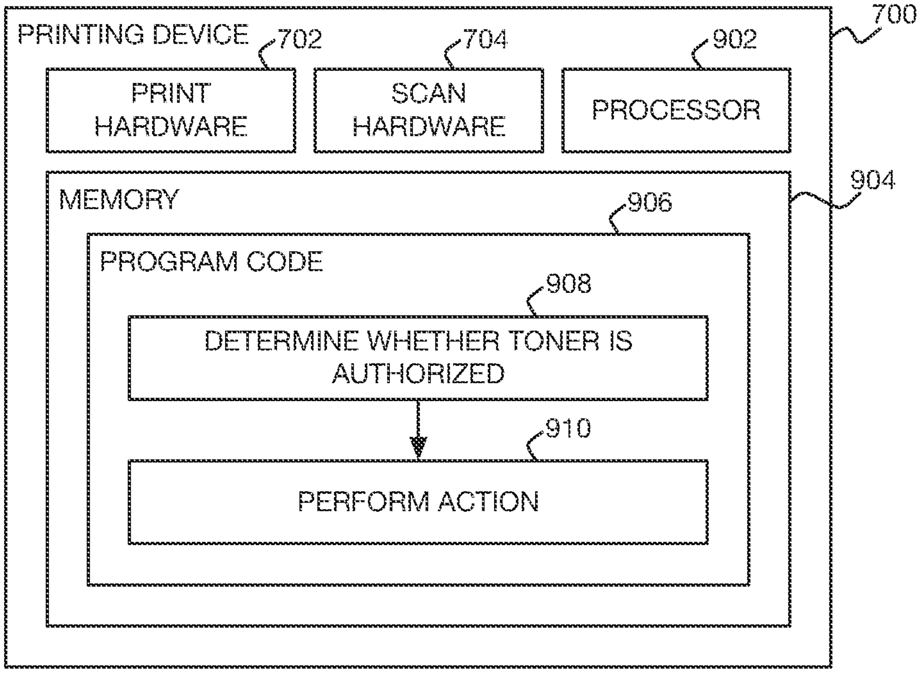
FIG. 9 is a block diagram of an example printing device.

FIG. 9 shows a block diagram of an example printing device 700 consistent with FIGS. 7 and 8. The printing device 700 includes print hardware 702 to print an image on a print medium using toner, and scan hardware 704 to optically scan the image as printed. The scan hardware 704 may be an optical scanning device that includes a series of light-emitting elements such as light-emitting diodes (LEDs) to illuminate a row of the image, and light sensors to detect the light reflected by that row of the image. In this way, the scan hardware 704 scans the printed image on a row-by-row (i.e., line-by-line) basis.

The printing device 700 includes a processor 902 and a memory 904 storing program code 906. The program code 906 is executable by the processor 902 to determine whether the toner used to print the image is authorized (908), in a toner scatter pattern-based manner, a printed (i.e., toner) color-based manner, and/or an image artifact-based manner as has been described. The program code 906 is executable by the processor 902 to further perform an action in response to determining that the toner is not authorized (910), as has also been described.

Figure 10:
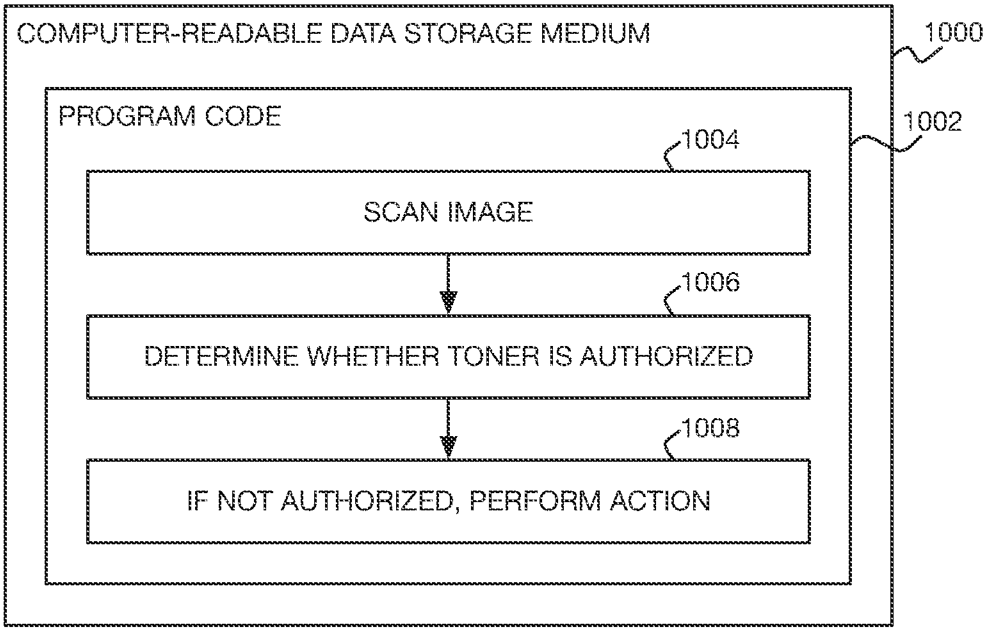
FIG. 10 is a diagram of an example non-transitory computer-readable data storage medium.

FIG. 10 shows an example computer-readable data storage medium 1000 storing program code 1002 executable by a device to perform processing. The device may be a printing device that prints an image using toner, and which may or may not include scan hardware. The device may instead be a host device that provide the image to the printing device and that is communicatively connected to the printing device and that may also be communicatively connected to a scanning device separate from the printing device. The device may instead be a cloud computing device to which the printing device, the host device, and/or the scanning device are communicatively connected.

The processing includes optically scanning an image printed using toner (1004). In the case in which the processing is performed by a host device or a cloud computing device, the device may optically scan the image in that the device receives the scanned image for a standalone scanning device or from the printing device if the printing device has scan hardware. The processing includes determining whether the toner is authorized (1006), in a toner scatter pattern-based manner, a printed (i.e., toner) color-based manner, and/or an image artifact-based manner as has been described. The processing can include, in response to determining that the toner is not authorized, performing an action associated with the toner, such as prohibiting further printing using the toner, and so on (1008).

Techniques have been described for determining whether toner used for printing is authorized, based on a scanned image that was printed using the toner. Such an authentication approach leverages the novel insight that authorized toner may result in printed images that differ in discernible ways than images printed using unauthorized toner. Moreover, the described techniques can be used to determine that an otherwise authorized toner cartridge has been refilled with unauthorized toner.

We claim:

1. A method comprising:

optically scanning an image printed using toner; and determining, by a processor, whether the toner is authorized by:

identifying a toner scatter pattern within the scanned image and determining whether the identified toner scatter pattern conforms to expected toner scatter patterns associated with authorized toner.

2. The method of claim 1, further comprising:

in response to determining that the toner is not authorized, performing an action associated with the toner, wherein the action comprises one or multiple of prohibiting further printing by a printing device in which the toner is installed, printing more slowly, and printing without specified picture quality enhancements.

3. The method of claim 1, further comprising determining, by the processor, whether the toner is authorized by also identifying a color within the scanned image, and determining whether the identified color conforms to an expected corresponding color associated with the authorized toner.

4. The method of claim 3, wherein determining whether the toner is authorized comprises additionally identifying the color within the scanned image and determining whether the identified color conforms to the expected corresponding color associated with the authorized toner.

5. The method of claim 4, wherein identifying the color within the scanned image comprises:

identifying within the scanned image a primary color of a color space of a printing device that printed the image.

6. The method of claim 4, further comprising:

identifying a background region of the scanned image corresponding to a background region color at which no toner was printed; and compensating for the background region color within the identified color.

7. The method of claim 6, wherein determining whether the identified color conforms to the expected corresponding color associated with the authorized toner comprises:

retrieving the expected corresponding color from image data of the image that was printed;

determining whether the identified color within which the background region color has been compensated for matches the retrieved expected corresponding color by more than a threshold corresponding to expected color accuracy tolerance of the authorized toner; and in response to determining that the identified color within which the background region color has been compensated for does not match the retrieved expected corresponding color by more than the threshold, concluding that the identified color does not conform to the expected corresponding color associated with the authorized toner.

8. The method of claim 1, wherein determining whether the identified toner scatter pattern conforms to the expected toner scatter patterns associated with the authorized toner comprises:

applying to the identified toner scatter pattern a machine learning model trained on a plurality of training toner scatter patterns identified within scanned images printed on print media using the authorized toner, generating a probability as to whether the toner is authorized; and in response to the probability being less than a threshold, concluding that the identified toner scatter pattern does not conform to the expected toner scatter patterns associated with the authorized toner.

9. The method of claim 1, further comprising determining, by the processor, whether the toner is authorized by also identifying an image artifact within the scanned image associated with failure of a cartridge in which the toner is installed and determining whether the image artifact conforms to expected image artifacts associated with failure of an authorized cartridge in which the authorized toner is installed, wherein determining whether the toner is authorized comprises:

identifying the image artifact within the scanned image associated with the failure of the cartridge in which the toner is installed and determining whether the image artifact conforms to the expected image artifacts associated with the failure of the authorized cartridge in which the authorized toner is installed.

10. The method of claim 9, wherein determining whether the image artifact conforms to the expected image artifacts associated with the failure of the authorized cartridge in which the authorized toner is installed comprises:

applying to the identified image artifact a machine learning model trained on a plurality of training image artifacts identified within scanned images printed on print media using the authorized toner as installed within authorized cartridges and associated with the failure of the authorized cartridges, generating a probability as to whether the toner is authorized; and in response to the probability being less than a threshold, concluding that the image artifact does not conform to the expected image artifacts associated with the failure of the authorized cartridge in which the authorized toner is installed.

11. A printing device comprising:

print hardware to print an image using toner;

scan hardware to optically scan the image as printed;

a processor, and a memory storing program code executable by the processor to determine whether the toner is authorized by:

identifying a toner scatter pattern within the scanned image and determining whether the identified toner scatter pattern conforms to expected toner scatter patterns associated with authorized toner;

and identifying an image artifact within the scanned image associated with failure of a cartridge in which the toner is installed and determining whether the image artifact conforms to expected image artifacts associated with failure of an authorized cartridge in which the authorized toner is installed.

12. The printing device of claim 11, wherein the scan hardware is inline and subsequent to the print hardware within a print path in which the image is printed on a print medium within the printing device using the toner, and the scan hardware is to scan the image as printed on the print medium.

13. The printing device of claim 11, wherein the print hardware comprises:

a photoconductive surface on which the toner is applied in correspondence with the image; and wherein a transfer roller is to transfer the toner applied in correspondence with the image to a print medium, and wherein the scan hardware is to scan the image as printed on the photoconductive surface prior to transfer to the print medium.

14. A non-transitory computer-readable data storage medium storing program code executable by a printing device to perform processing comprising:

optically scanning an image printed by the printing device using toner;

determining whether the toner is authorized by:

identifying a toner scatter pattern within the scanned image and determining whether the identified toner scatter pattern conforms to expected toner scatter patterns associated with authorized toner;

identifying a color within the scanned image and determining whether the identified color conforms to an expected corresponding color associated with the authorized toner; and identifying an image artifact within the scanned image associated with failure of a cartridge in which the toner is installed and determining whether the image artifact conforms to expected image artifacts associated with failure of an authorized cartridge in which the authorized toner is installed; and in response to determining that the toner is not authorized, performing an action associated with the toner.

* * * * *